(12) United States Patent
Brown et al.

(10) Patent No.: US 6,600,481 B1
(45) Date of Patent: Jul. 29, 2003

(54) DATA ENTRY APPARATUS AND METHOD

(75) Inventors: Dan Brown, Newark, CA (US); Kristina Maliniak, San Francisco, CA (US); Kim Althoff, San Jose, CA (US); Tim A. Williams, Danville, CA (US)

(73) Assignee: Glenayre Electronics, Inc., Duluth, GA (US)

( * ) Notice: Subject to any disclaimer, the term of this patent is extended or adjusted under 35 U.S.C. 154(b) by 0 days.

(21) Appl. No.: 08/661,440

(22) Filed: Jun. 10, 1996

(51) Int. Cl.$^7$ ................................................. G09G 5/00
(52) U.S. Cl. ........................ 345/169; 345/168; 375/219; 455/73
(58) Field of Search .......................... 340/825.44, 318; 345/168–169, 123–124, 141, 173; 341/22; 375/219; 455/73, 74.1, 550

(56) References Cited

U.S. PATENT DOCUMENTS

| | | | |
|---|---|---|---|
| 4,713,808 A | | 12/1987 | Gaskill et al. |
| 4,845,491 A | | 7/1989 | Fascenda et al. |
| 4,875,038 A | | 10/1989 | Siwiak et al. |
| 4,896,370 A | * | 1/1990 | Kasparian et al. .......... 345/168 |
| 4,928,096 A | | 5/1990 | Leonardo et al. |
| 4,951,044 A | | 8/1990 | Nelson et al. |
| 5,012,234 A | | 4/1991 | Dulaney et al. |
| 5,088,070 A | * | 2/1992 | Shiff .......................... 345/156 |
| 5,122,795 A | | 6/1992 | Cubley et al. |
| 5,182,553 A | | 1/1993 | Kung |
| 5,185,604 A | | 2/1993 | Nepple et al. |
| 5,250,930 A | * | 10/1993 | Yoshida et al. .............. 345/168 |
| 5,258,751 A | | 11/1993 | DeLuca et al. |
| 5,283,832 A | | 2/1994 | Lockhart, Jr. et al. |
| 5,285,496 A | | 2/1994 | Frank et al. |
| 5,418,528 A | * | 5/1995 | Hosack et al. ......... 340/825.44 |
| 5,430,436 A | * | 7/1995 | Fennell ........................ 345/169 |
| 5,452,356 A | | 9/1995 | Albert |
| 5,459,456 A | * | 10/1995 | Hosack et al. ......... 340/825.44 |
| 5,459,458 A | | 10/1995 | Richardson et al. |
| 5,479,408 A | | 12/1995 | Will |
| 5,510,810 A | * | 4/1996 | Nishijima et al. ........... 345/156 |
| 5,572,650 A | * | 11/1996 | Antis et al. .................. 395/356 |
| 5,737,619 A | * | 4/1998 | Judson ........................ 395/761 |
| 5,768,578 A | * | 6/1998 | Kirk et al. ................... 395/611 |
| 5,825,353 A | * | 10/1998 | Will ............................. 345/184 |

OTHER PUBLICATIONS

PCT International Search Report, 94780.P024PC, PCT/US97/10038, 6 pgs.
PCT International Search Report, 94780.P026PCT, PCT/US97/10035, 6 pgs.
PCT International Search Report dated Jan. 12, 1998, 94780.P025PC, PCT/US97/10036, 6 pg.

\* cited by examiner

*Primary Examiner*—Bipin Shalwala
*Assistant Examiner*—Ricardo Osorio
(74) *Attorney, Agent, or Firm*—Christensen O'Connor Johnson Kindness PLLC

(57) ABSTRACT

A pager capable of origination of and transmission of messages. The pager, in one embodiment, features two-way communication capability and stores both a transmit and receive antenna within a single housing. The pager also features a data entry device which allows entry of alphanumeric characters. The data entry device provide for numerous advantages including allowing the pager to transmit original, non-responsive messages to any of a variety of addresses either selected from a stored address list or input by the user. In addition, messages may be received/stored in a number of folders leading to advantages in message management.

13 Claims, 14 Drawing Sheets

DATA ENTRY APPARATUS AND METHOD

BACKGROUND OF THE INVENTION

1. Field of the Invention

The present invention relates to the field of communication devices such as pagers.

2. Description of the Related Art

Pagers have gained popularity in recent years. Early on, these devices provided one-way communication—i.e., a person could be paged by dialing a preassigned telephone number and entering some numeric information, such as a telephone number to be called, and as a result the information entered would be displayed a short time later on the person's pager. Eventually, paging systems added the ability to provide alphanumeric messages. Typically, this is done by contacting an operator and requesting the operator to type an alphanumeric message for display on a designated pager. Eventually, two-way paging systems were developed.

A prior art paging device 100 for use with a two-way paging system is illustrated by FIG. 1. This prior art device is representative of two-way pagers available from Motorola, Inc. of Schaumberg, Illinois. Generally, this prior art device operates by allowing a user to receive a message which is displayed on display 104. When a message is received, the pager 100 will notify the user (such as by emitting an audible sound or by vibrating). The user may then display the message by depressing button 107(*d*). Other function buttons 107(*a*)–(*c*) and 108–109 are provided which perform other functions. For example, buttons 108 and 109 are used in one mode to enter answers to questions (i.e., button 108 is pressed for an answer "yes" and button 109 is depressed for an answer "no" to a question such as "Delete ALL msgs Are you sure?"). The device 100 features a lid 104 which provides the dual function of covering the display 104 and buttons 107(*a*)–(*d*) and of providing a place to locate an antenna.

The second function of lid 104, allowing placement of an antenna, is an important function because two-way pager 100 requires placement of two antennas—one for transmit and one for receive. The antennas are stored in separate housing (one in the main housing of pager 100 and one in the lid) to minimize their interference with each other. Thus, while after use of the pager device 100, the lid may seem cumbersome to some users (the pager must be opened to view messages leading to the extra step in reviewing messages of opening the lid 104 as messages are received), the lid's purpose of storing an antenna in a housing which is separate from the main antenna could be viewed as almost its main purpose.

While pager 100 offers the ability to send and receive messages, various shortcomings may be noted. For example, in addition to requiring a lid which must be opened and closed when viewing messages, pager 100 essentially may be viewed as a one and one-half way (as opposed to one way or two way) paging device in that a user may only send a message in response to a message which has been received. In addition, messages which are sent are limited to allowing the user to select from a menu of responses (e.g., "Will call in 10 mins"; "On my way"; "Yes"; "No", etc.) These limited capabilities may, of course, be due to the difficult problem of addressing, much less composing, a message—exactly how, in a device as compact as a pager, do you allow for the flexibility to enter custom addresses and message text?

What is desired is a pager which allows use of fuller advantage of two-way communication capabilities while providing a compact and easy to use style.

SUMMARY OF THE INVENTION

A data entry method and apparatus is described for use with a wireless messaging unit such as a pager. The data entry apparatus comprises a data entry device having a left tab, a right tab, an up tab, a down tab and an enter button and a display containing alphanumeric characters for selection using the data entry device.

The display further includes tokens for performing functions such as text insertion interspersed among the alphanumeric characters.

BRIEF DESCRIPTION OF THE DRAWINGS

FIG. 6(*b*) illustrates a side view the PCB inside pager 200.

Figure 1:
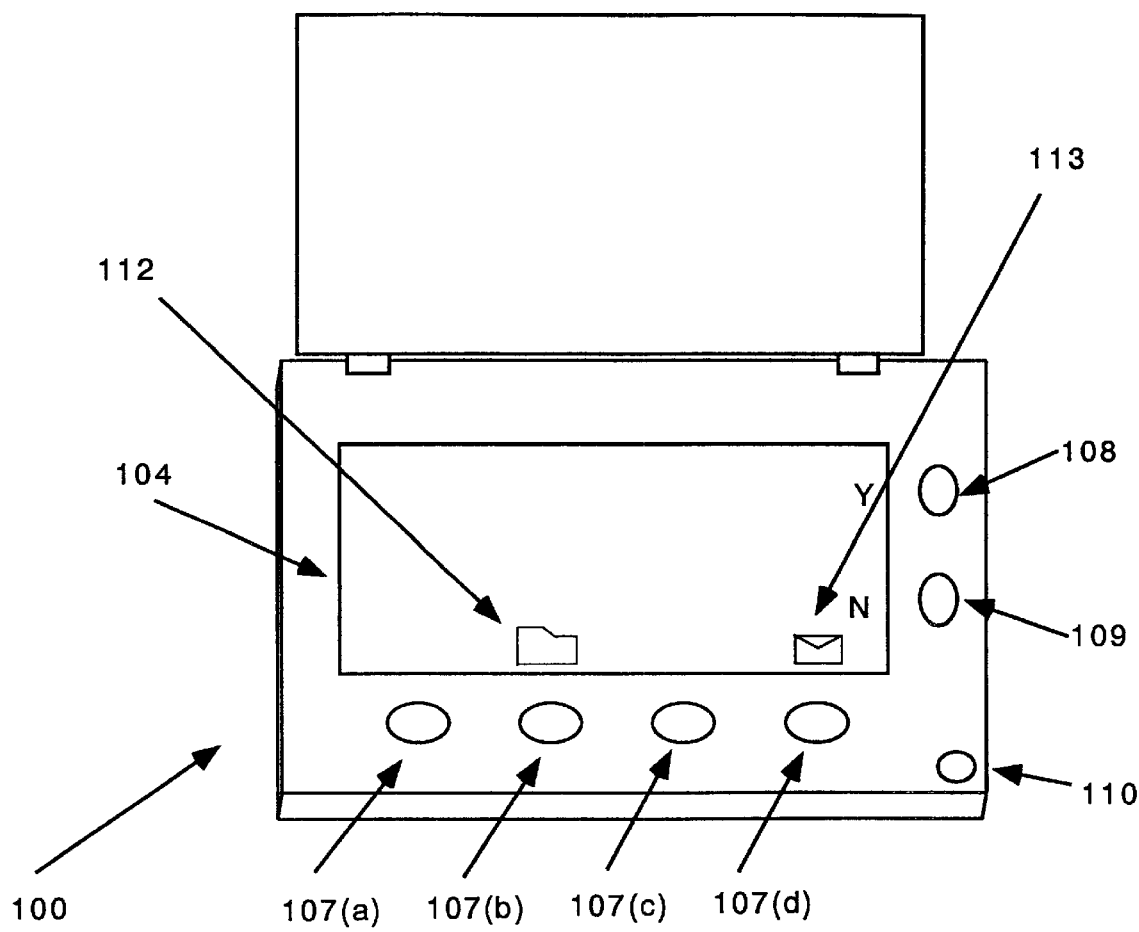
FIG. 1 illustrates a prior art pager device 100.
Figure 3:
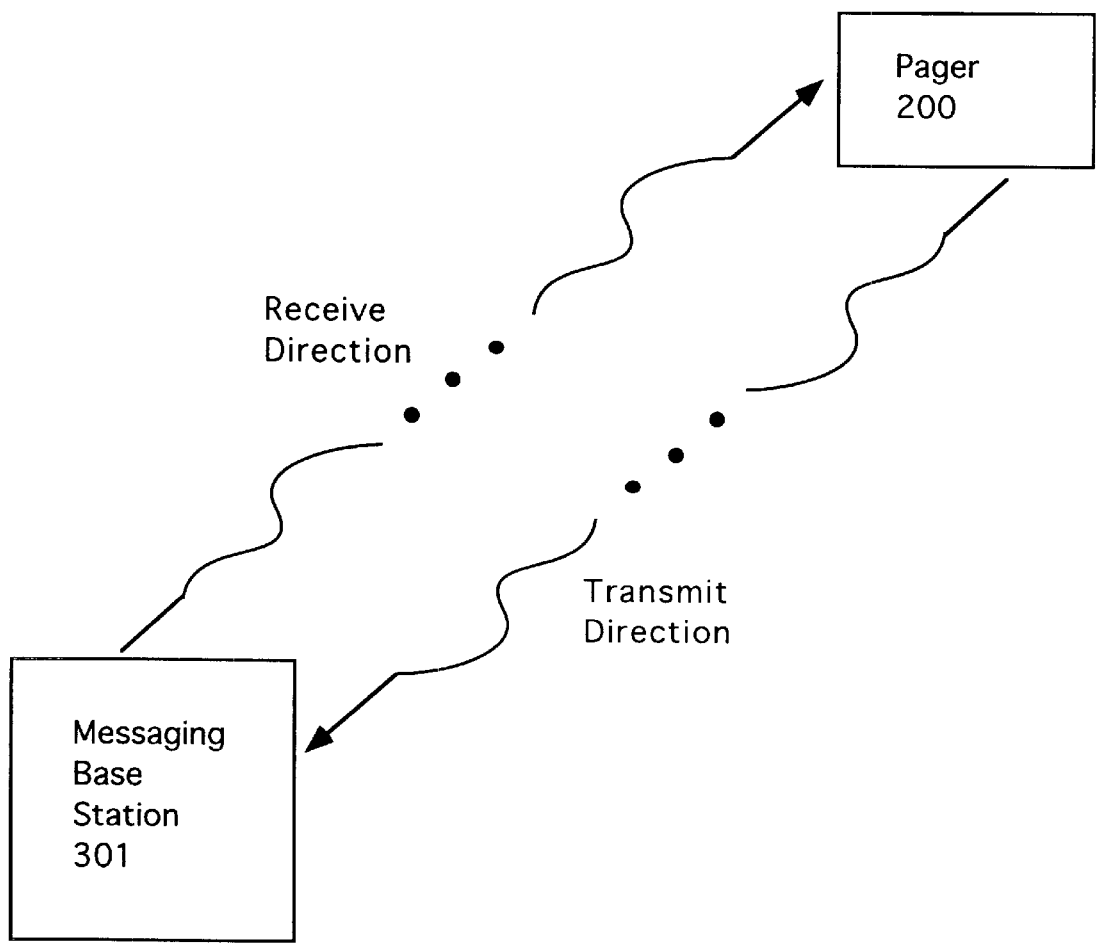
FIG. 3 illustrates a two-way pager network as may be utilized by the present invention.

For ease of reference, it might be pointed out that reference numerals in all of the accompanying drawings typically are in the form "drawing number" followed by two digits, xx; for example, reference numerals on FIG. 1 may be numbered 1xx; on FIG. 3, reference numerals may be numbered 3xx. In certain cases, a reference numeral may be introduced on one drawing and the same reference numeral may be utilized on other drawings to refer to the same item.

DETAILED DESCRIPTION OF THE PREFERRED EMBODIMENT

What is described herein is a pager useful for communication of information. In the following description, numerous specific details are set forth in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

OVERVIEW OF A PAGER AS MAY UTILIZE THE PRESENT INVENTION

Figure 2:
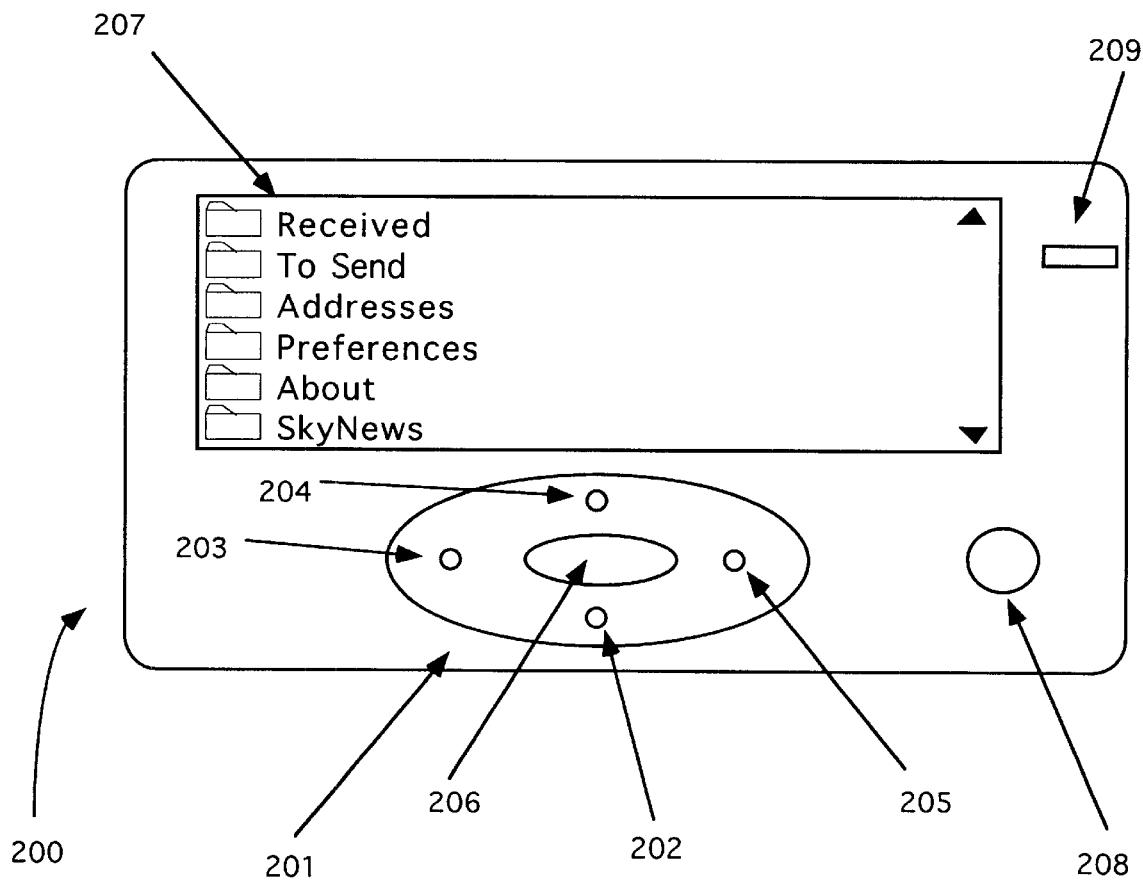
FIG. 2 illustrates an embodiment of a pager device 200 as may be utilized by the present invention.

FIG. 2 illustrates a pager 200 as may implement the present invention. The pager 200 may communicate by both transmitting messages to and receiving messages from a messaging base station such as illustrated in FIG. 3 as base station 301. While this communication may take advantage of the conventional radio frequency signaling and the like, the present invention offers a number of advantages in operation of and communication with the pager 200.

The pager comprises a data entry device 201, a display 207 and an indicator 209. Indicator 209 provides a visual indication (e.g., light) when messages are received.

The data entry device 201 which allows both selection of functions to be performed by the pager 200 and entry of data. The data entry function will be described in greater detail below in connection with discussion of the data entry screen and token placement. The data entry device comprises a down tab 202, a left tab 203, an up tab 204 and a right tab 205. These tabs 202–205 may be used to move a selection cursor on display 207. In addition, data entry device 201 comprises an enter function 206. As can be seen from a review of the figure, the tabs 202–204 and enter function 206 are all contained within an oval area. Of course, alternate designs may be utilized.

Enter function 206 may be used to select an icon, alphanumeric character, token (described below), etc. on display 207 when the cursor has been moved to the item to be selected. In addition, data entry device 201 comprises (somewhat offset from the rest of data entry device 201) an exit button 208.

Figure 4:
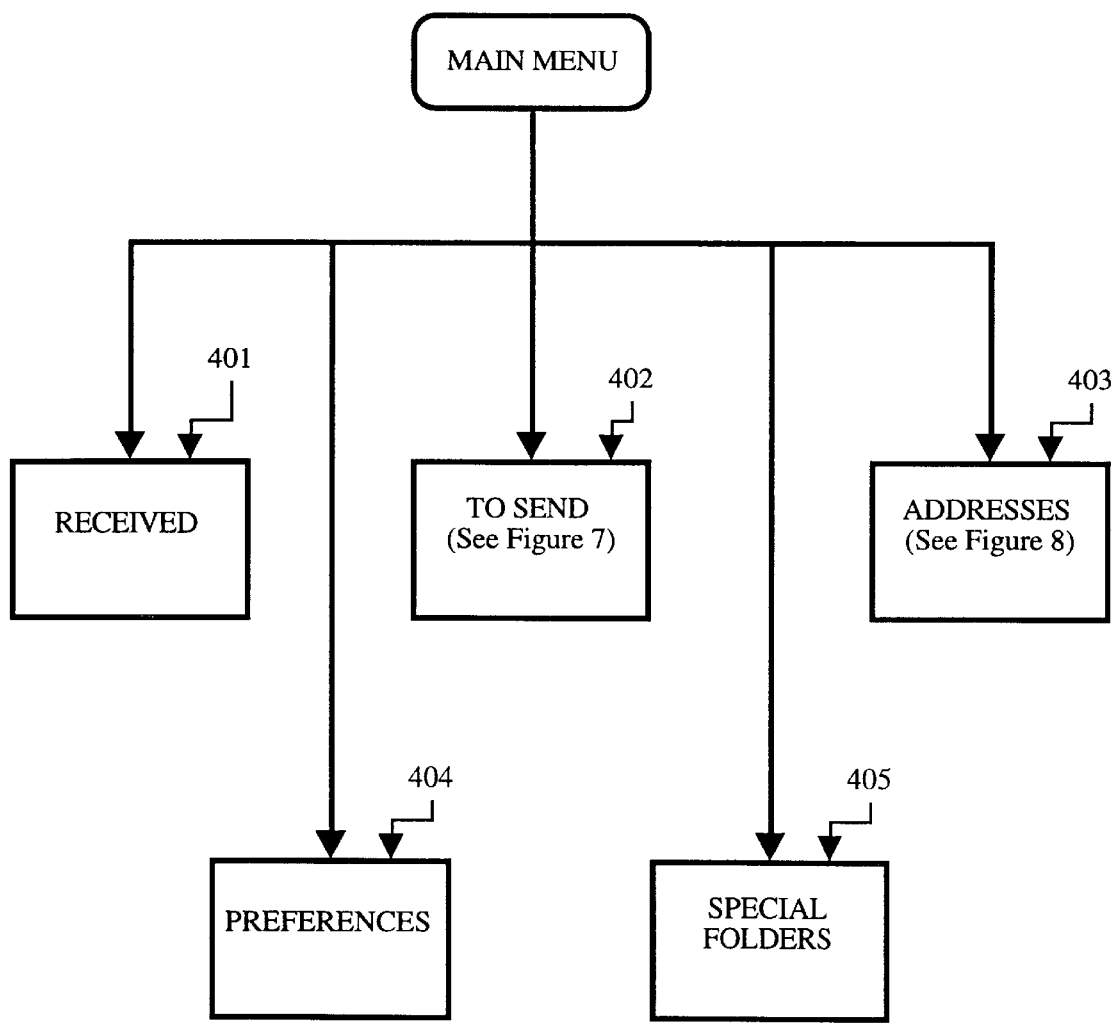
FIG. 4 is a diagram depicting functions which may be implemented in a pager of the present invention.

Display 207 may initially, when the device is powered on or otherwise returned to a default mode, display a set of folders such as the illustrated "Received" folder, "To Send" folder, "Addresses" folder, "Preferences" folder, "About" Folder and "SkyNews" folder. Each of the folders corresponds to a function which will be described in greater detail below. This folder-based concept is also illustrated by the diagram of FIG. 4 which illustrates the display 207 as providing a main menu from which one of five functions (RECEIVED 401, TO SEND 402, ADDRESS 403, PREFERENCES 404 or SPECIAL FOLDERS 405) may be selected. For example, the "Received" folder allows viewing of received messages. In addition, a message which has been received may be replied to or stored in an alternate folder. The "To Send" folder allow the user to send an original message. The address folder allows creation and updating of address lists. The preferences folder allows for selection of certain preferences such as setting of time of day, date, selection of a type of alert (beep, vibrate), etc. The special folders provides for various special types of folders for storing of messages. For example, as illustrated, a folder may be provided for storing of messages received from a news service such as the well-known SkyNew™ service, ESPN™, etc.

Before continuing with discussion, it may be worthwhile to set forth a definition of the term "pager" as used herein. A pager, as that term is used herein, is a wireless communication device which is capable of selectively accepting messages (sometimes referred to as calls) over-the-air nand either displaying the messages to a user or of storing the messages on a storage device within the pager (for later retrieval and display). Pagers are, of course, well-known in the art, and therefore pager technology in general will not be described in detail. A pager, as that term is used, is distinct from other selective call receivers such as cellular telephones which typically do not provide for display of messages or for storages of messages at the cellular telephone. Aspects of the present invention may have application in both "dedicated pagers", i.e., devices which are intended primarily to provide the function of receiving (and, in the case of two-way pagers sending) messages and in "non-dedicated pagers", i.e., devices which provide among other functions the function of receiving (and, in the case of two-way pagers sending) messages. For example, as one inventive aspect of the present invention, it is proposed that aspects of the present invention may be implemented in a personal digital assistant which provides a paging function.

In addition, certain aspects of the invention described herein have equal application to various selective call receivers including pagers and cellular telephones.

The present application will sometimes refer to two-way pagers which are generally pagers capable of both receiving and sending messages over-the-air.

It might also be noted that the term "folder" is used herein to refer to a memory storage location which provides for storage of certain information (such as, for example, of messages to be sent) together with an icon which may be displayed on display 207 to represent the memory storage area. In addition, as has been discussed above, a function (such as sending of a message) may be associated with a certain folder and selection of the folder will cause the user to be stepped through a series of steps to complete the function (such as sending a message in response to selecting the "To Send" folder).

DESCRIPTION OF THE LIDLESS TWO-WAY PAGER DESIGN AND ANTENNA STRUCTURE

Before moving forward with description of an embodiment of the present invention, it is worthwhile to turn back to the prior art device of FIG. 1. As was discussed above, the device of Figure comprises a lid 105. Pager 100 may be, typically, left with its lid closed except when it is in actual use. This may provide for certain advantages including protection of the display 104. However, as one aspect of the present invention, it was discovered that use of a lid in a pager is relatively cumbersome, but apparently prior artisans found it to be necessary in order to allow for housing of one of the two antennas found in pager 100. In the present invention, it was discovered not only that use of a lid over the display 104 was cumbersome, but also that the problem of needing a housing for a second antenna in a two-way paging device could be solved by placing the second antenna in the main pager housing. This presented difficulties, apparently not solved in the prior art, in that the two antennas when placed in the same pager housing could cause interference with each other.

Figure 6A:
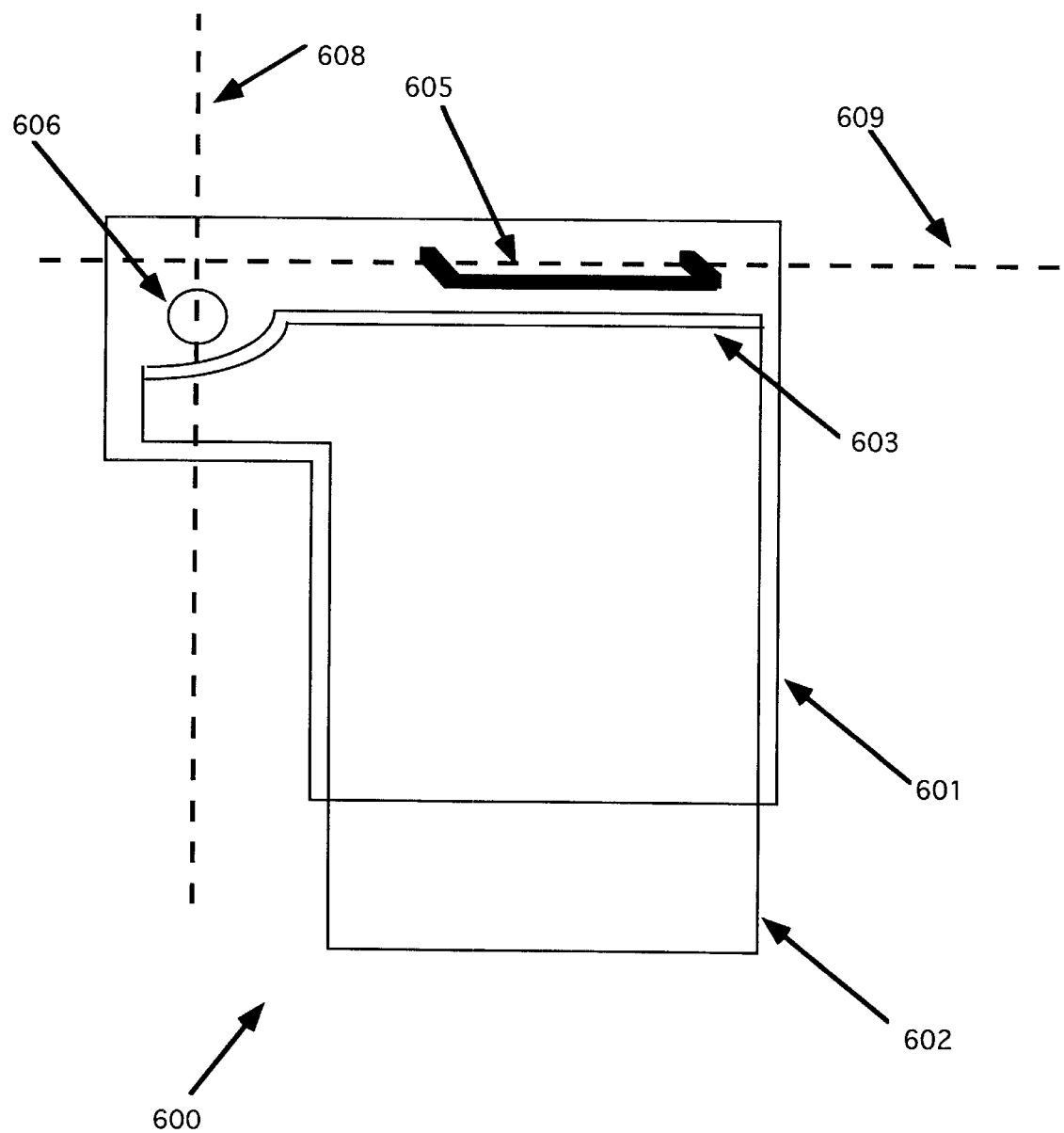
FIG. 6(*a*) illustrates a top view of a PCB inside pager 200 including illustrating placement of antennas 605 and 606.
Figure 6B:
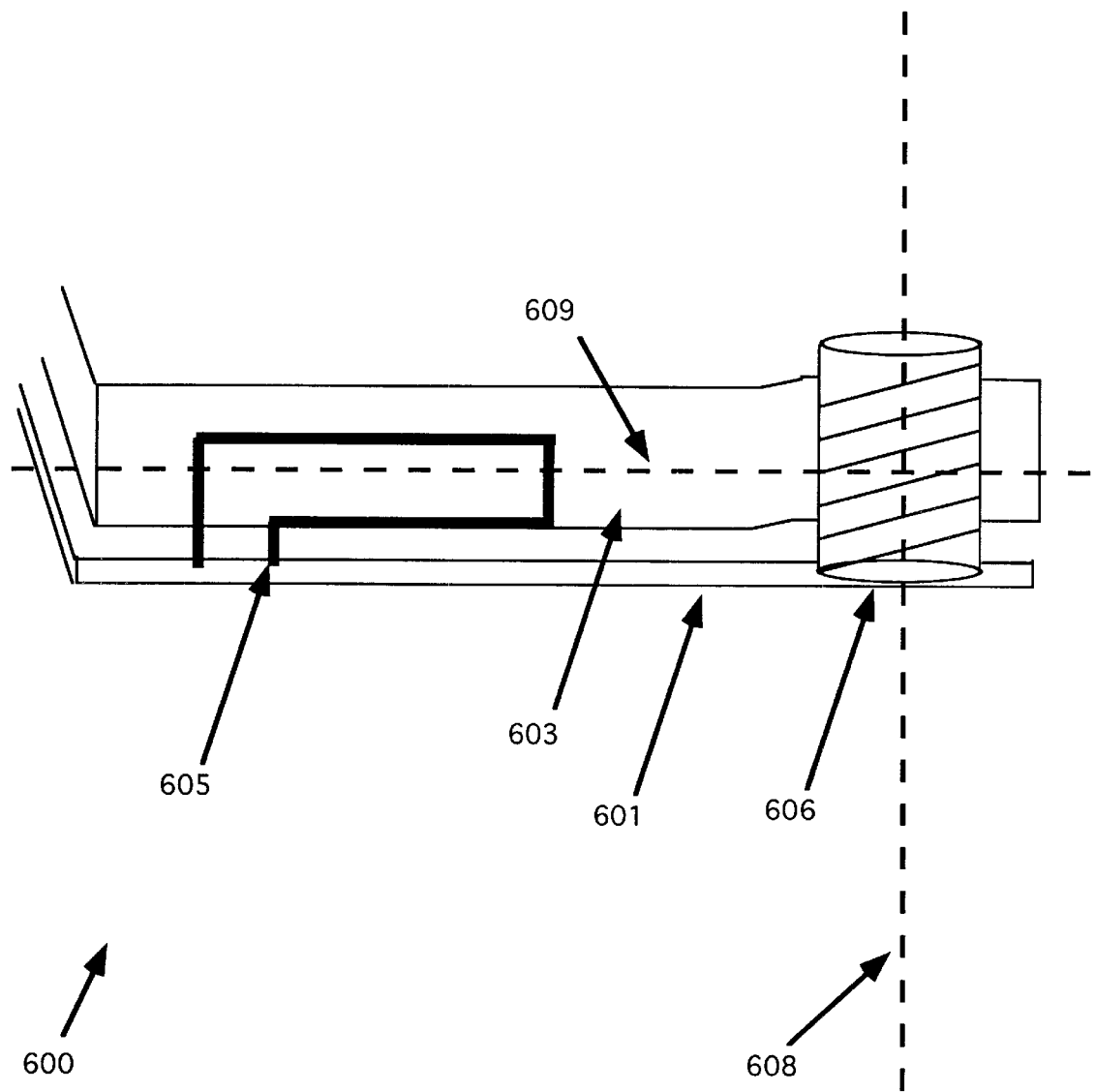

The disclosed embodiment of the present invention overcomes this problem by utilizing a design more fully shown by FIGS. 6(a) and (b). FIG. 6(a) illustrates a top view of a PCB inside pager 200 including illustrating placement of antennas 605 and 606. FIG. 6(b) illustrates a side view the PCB.

The PCB assembly 600 is housed within the single housing of pager 200. The PCB assembly 600 comprises a printed circuit board (PCB) 601. A receive antenna 605 and a transmit antenna 606 are placed on the PCB 601. In the described embodiment, the receive antenna 605 is a loop antenna and the transmit antenna 606 is a helix antenna. In the present invention, it has been discovered that use of antennas of these differing designs reduces interference between the signal planes of the two antenna. This is illustrated in FIG. 6 by illustrating a signal plane 608 generated by transmit antenna 606 and a signal plane 609 generated by receive antenna 605. As can be seen, the common areas of the two signal planes is minimized in this design allowing for both the transmit and receive antennas to be located within a single housing and providing for the availability of an advantageous lidless two-way pager design.

The PCB assembly 600 further comprises a metal shield 602 which acts to shield the antennas from interference from the various circuits provided on PCB 601. In addition, as illustrated by FIG. 6(a) and especially by FIG. 6(b), the shield 602 includes a raised portion 603 which additionally provides for independent environments for antenna 605 and 606 by placement of antenna 606 slightly behind the flat portion of raised shield 603.

DESCRIPTION OF METHODS OF ORIGINATION OF MESSAGES

Sending Original. Non-Responsive Messages

The prior art pager 100 of FIG. 1 provides for both receipt and limited transmission of messages. In particular, when a message is received by pager 100, it may be responded by selecting a reply function. Content for a reply may be selected from a stored reply list, and the reply message is transmitted. In short, a message may be transmitted in response to a received message. The transmitted message will be addressed to the address of the sender of the received message. An original message, however, may not be composed and sent to some arbitrary address.

Figure 7:
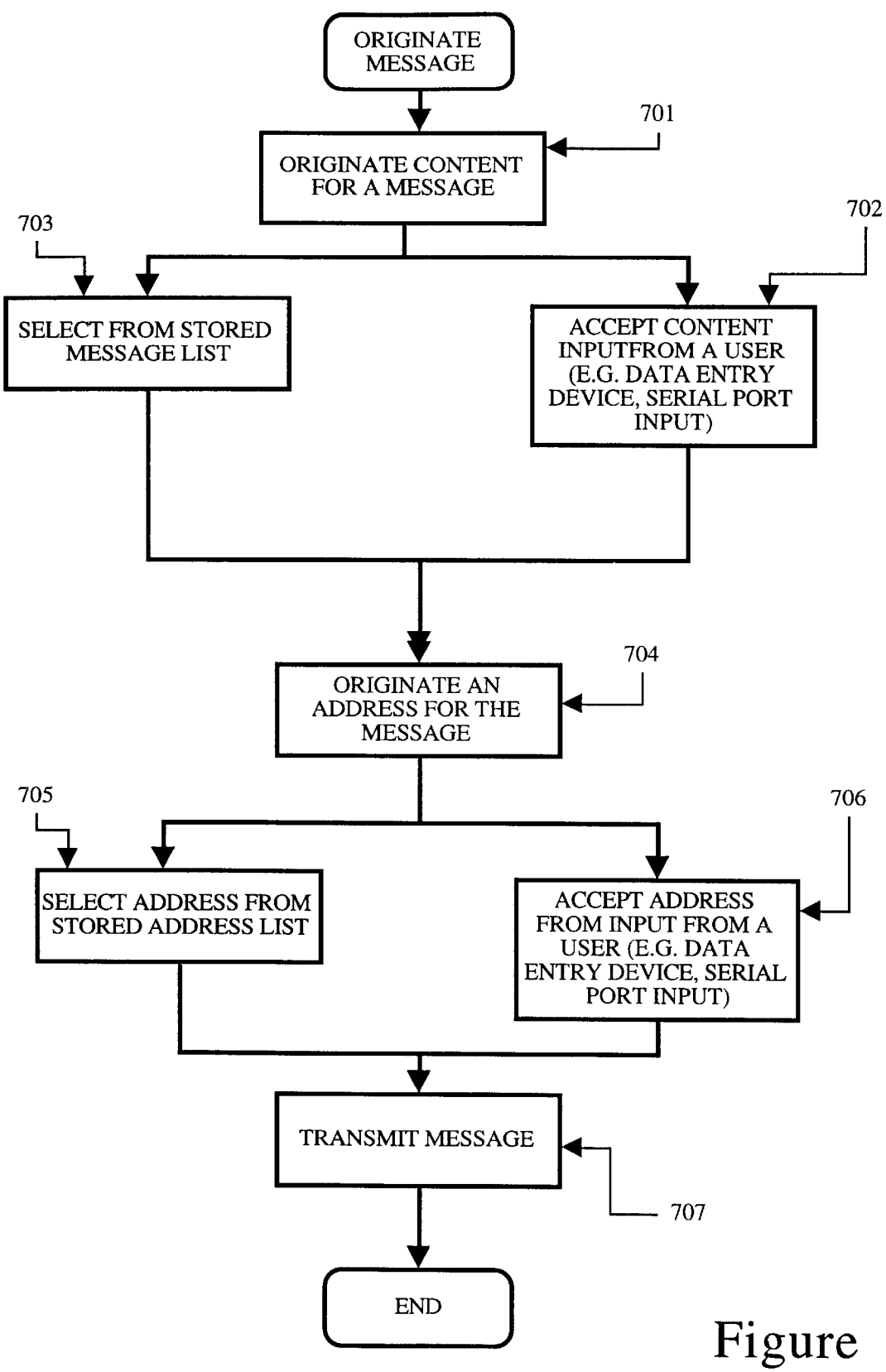
FIG. 7 illustrates a method of the present invention for transmission of original, non-responsive messages.

As one advantage of the present invention, it is disclosed to transmit original, non-responsive messages from a pager. A method of the present invention of transmitting original, non-responsive messages is illustrated in FIG. 7. As is illustrated by FIG. 7, content for a message is originated 701 by either selecting content from a stored list 703 or by accepting content input from a user 702. The stored list may include, simply by way of example, a set of common messages such as:

"yes/OK";
"will arrive in 5 min";
"no";
"maybe";
"Thank you";
"You're welcome";
"I'll call you later";
"On my way";
etc. Alternatively, the pager 200 may accept content input from a user. For example, the pager 200 may accept content input by allowing the user to type an alphanumeric message using data entry device 201 together with the alphanumeric display which will be discussed in greater detail in connection with FIG. 5, below. Alternatively, the pager 200 may accept content input by allowing a user to load message content into the pager 200 through a serial port which may be coupled to, for example, a personal computer. Of course, this second alternative allows for relative ease in data input but requires access to a personal computer or similar device at the time the message is composed. The message may be composed on the personal computer, accepted by the pager 200 over the serial link (or other communications link) and stored for later transmittal.

It should be noted that the two methods of accepting data input may be combined in the described embodiment. For example, a user may select one of a set of prestored messages and then proceed to edit and customize the prestored message using the data entry device 201. As an example, the message above which states "will arrive in 5 mins" may be selected and edited to state "will arrive in 30 mins".

An address may then be originated for the message 704 (alternatively, the message content may be stored for later retrieval and addressing). The address may be originated by selecting an address from a prestored address list 705 or by accepting input from a user 706 (again, this may be from the data entry device 201 or from a serial input or other communication line).

As one feature of the present invention, the address may be one of any of a large variety of address types. For example, the address may simply be a one or two-way pager address. Additionally, the address may be an email address or address of a worldwide web (WWW) page. The messaging base station 301 and other parts of the ground network provide a connection to the internet or other electronic mail delivery system. Further, the address may be a telephone number. A user may specify, for example, a telephone number of a facsimile machine and a facsimile message may be transmitted. Thus, as one feature of the present invention, two-way communication may be established between the pager 200 and any of several communication medium by allowing addressing of messages using various address types.

The message may be immediately transmitted 707 or it may be stored for later transmission. In the described embodiment, the message is stored in a folder titled "To Send"; however, in alternative embodiments the folder title may, of course, vary without departure from the spirit and scope of the present invention. When the message is selected for transmission, it is marked in the "To Send" folder as being sent. This feature allows the user to know the current status of the message. In addition, the present invention provides for a send queue, allowing a number of messages (up to 50 in the described embodiment) to be queued for transmission. The queued messages are marked "pending" in the folder and, after a first message is transmitted, the next message in the queue is selected for transmission.

Of course, messages may be addressed before the content is input and the above description is not intended to imply any order to this process. However, as one feature of the present invention, after completion of the step of providing content for a message, the interface of the present invention automatically allows origination of an address by displaying and highlighting on the display 207 an "Address" function.

In addition, the present invention provides for allowing a reply message to be composed in response to an incoming received message. The reply message may be composed, for example, with the data entry device 201 and is not limited, as in the prior art, to being selected from a list of stored reply messages.

Creation/Storage of Address Lists

Figure 8:
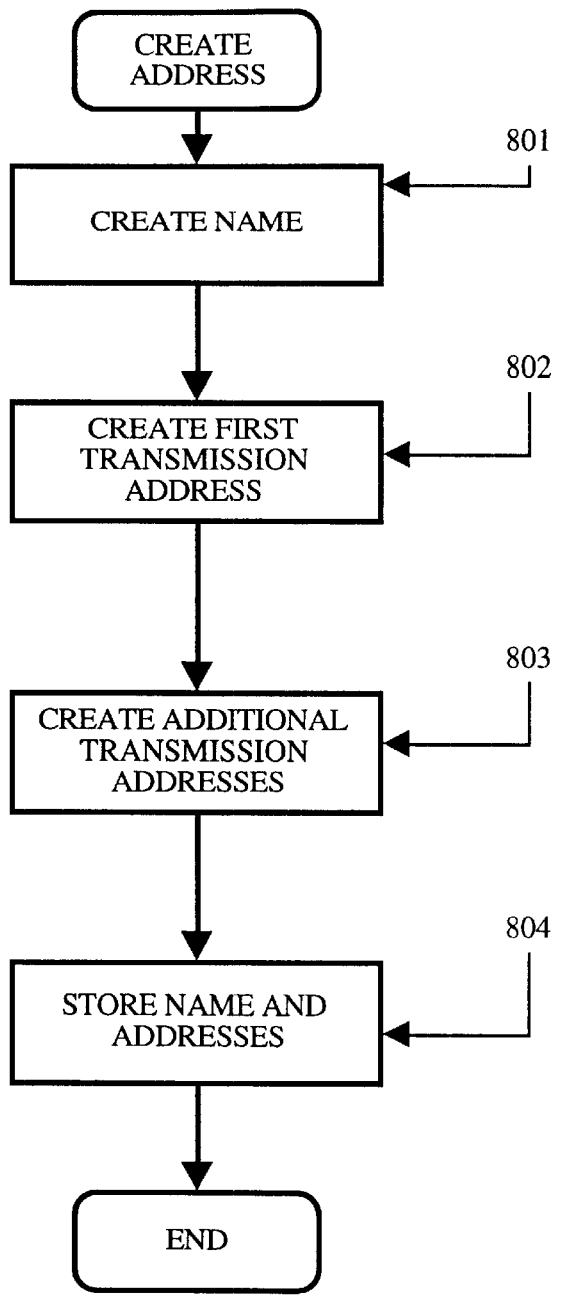
FIG. 8 illustrates a method of the present invention for storing address lists.

While it has been mentioned above in connection with the step of originating an address for a message, the present invention's feature of allowing for creation and storage of address lists in pager 200 is worth further note. As was discussed above at least implicitly, the prior art pager 100 does not provide for storage of addresses for message and rather relies on using the sender's address for the destination address when a user wishes to respond to a message. As one important aspect of the present invention, the present invention provides for storing of address information which is used for addressing messages. A method used in the described embodiment of the present invention for creating and storing address information is discussed in connection with FIG. 8.

A user may begin the process of creating an address by selecting the "Addresses" folder (illustrated on display 207 of FIG. 2). The user is then presented with an option of creating a name for the address 801. For example, if the address is for "John Doe", the name John Doe may be created. In the described embodiment, the name may be created using the data entry device 201 together with the alphanumeric display which will be discussed in greater detail in connection with FIG. 5, below. The address may also be entered by loading the address from a personal computer, personal digital assistant or other device over a communication link, such as a serial link.

Alternatively, when selecting the "Addresses" folder, a user may select an existing stored address for editing.

After creating the name 801, the users creates a first transmission address 802. The transmission address to be created may be one of a variety of address types (one way pager, two way pager, email, WWW page, facsimile telephone number, regular voice telephone number using text to voice synthesis for transmission of the messgae, etc.). Again, the transmission address may be created using the data entry device 201 together with the alphanumeric display.

Additional addresses, of other types, may be created for the name, 803. For example, the user may store a pager address, an email address and a facsimile telephone number for "John Doe". The name and addresses are then stored for later access 804.

DESCRIPTION OF DATA ENTRY DEVICE OF THE PRESENT INVENTION

The "Data Entry Device" 200

One of the issues in designing a keypad system for a pager is that space is at a premium because the overall size of the pager is ideally kept small. Therefore, use of a traditional keyboard for data entry would pose problems and, as discussed with respect to the pager illustrated in FIG. 1, prior art pagers have typically allowed data entry by simply allowing selection of prestored messages. In addition to problems posed by the keypad system, the display on pagers is typically relatively small. In the preferred embodiment, the display provides four lines of 20 characters eahc of input. The present invention overcomes the difficulties of allowing character selection with such a small display as will be described in greater detail below.

The present invention advances over the prior art by allowing selection of alphanumeric characters to compose messages, addresses and the like.

As was discussed, the described embodiment of the present invention provides a data entry device 201. This data entry device serves the dual purpose of allowing selection of folders and other items on the display screen by allowing movement of a cursor by manipulation of tabs 202–205 and allowing selection of alphanumeric characters by selecting the characters (again, through manipulation of tabs 202–205) on the data entry screen which will be discussed in connection with FIG. 5.

Data Entry Screen

Figure 5:
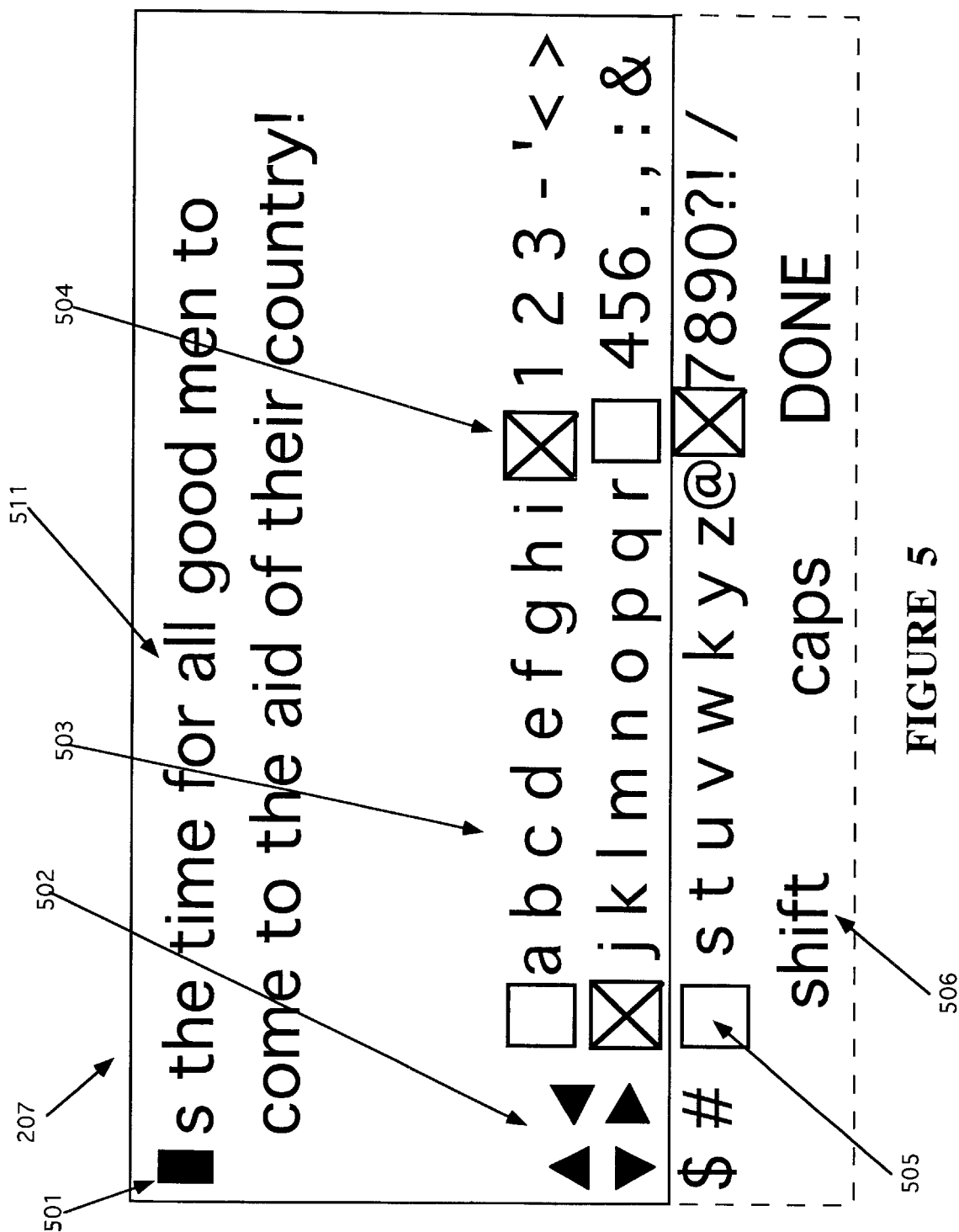
FIG. 5 illustrates a data entry display as may be utilized by the present invention.

FIG. 5 illustrates a data entry screen which may be displayed on display 207 and may be utilized by the present invention. The data entry screen comprises a text area 511 where the entered text is displayed (e.g., "s the time for all good men to come to the aid of their country". In addition, the data entry screen comprises a alphanumeric character selection area 503. The alphanumeric character selection area 503 comprises a set of alphanumeric characters arranged on three rows. In the described embodiment, only two rows are displayed on display 207 at any given time and the up tab 204 and down tab 202 are used to scroll up and down to gain access to all lines. This is illustrated in FIG. 5 by showing the third line off of display 207 (within the dashed line area). In addition, a line is provided to allow selection (again by manipulating the cursor using tabs 202–205 and enter function 206) of certain functions including "shift" which allows conversion of the alphabetic characters to upper case prior to selection of a next character, "caps" which allows conversion of the alphabetic characters to upper case for entry of a series of characters, and "DONE" which is selected after completion of entry of the message. The described embodiment also allows the entry of the message to be terminated without storing the message by depression of the exit function 208.

In FIG. 5, an edit cursor is illustrated with black box 501. The edit cursor 501 indicates the position for insertion of the next character. The position of the edit cursor may be manipulated by selecting one of the cursor tokens 502 (e.g., the up arrow to move the edit cursor up, the down arrow to move the cursor down, the right arrow to move the cursor right and the left arrow to move the cursor left). Tokens 502 are selected by manipulation of the tabs 202–205

"Token" Placement

As an important feature of the alphanumeric selection area 503, tokens are interspersed within the alphanumeric selection area 503. The tokens may be selected to provide various frequently used functions and a particular token type may be interspersed with selection area 503 more or less frequently dependent on the expected frequency of use by users. In the described embodiment, space tokens 505 (represented by outlined squares) are provided to allow insertion of a space in the text being composed. Delete tokens 504 (represented by outlined squares with an X inside) may be selected to allow deletion of a character.

After the user selects either a token or a alphanumeric character by manipulating the selection cursor with tabs 202–205, the enter button 206 may be depressed and the character is added to the text in area 511.

ORGANIZATION OF MESSAGES IN A PAGER

Provision for Multiple Folders for Storing Messages

Once again it is worthwhile to review the pager 100 of the prior art. As is illustrated by FIG. 1, the prior art pager 100 provides a single folder 112 for storing messages which have been read and a single folder 113 for receiving messages. When a message is received by the pager, the user accesses the message by opning folder 113. Folder 113 is opened by depressing button 107(d) below the folder 113. A list of messages received by the device is then displayed. After a message is received in folder 113 and read, it may be moved to the storage folder 112 by depressing the button 107(b) below the folder 112. This allows the user the limited capability to manage messages by saving messages into folder 112 after they are received and read in folder 113.

Figure 9:
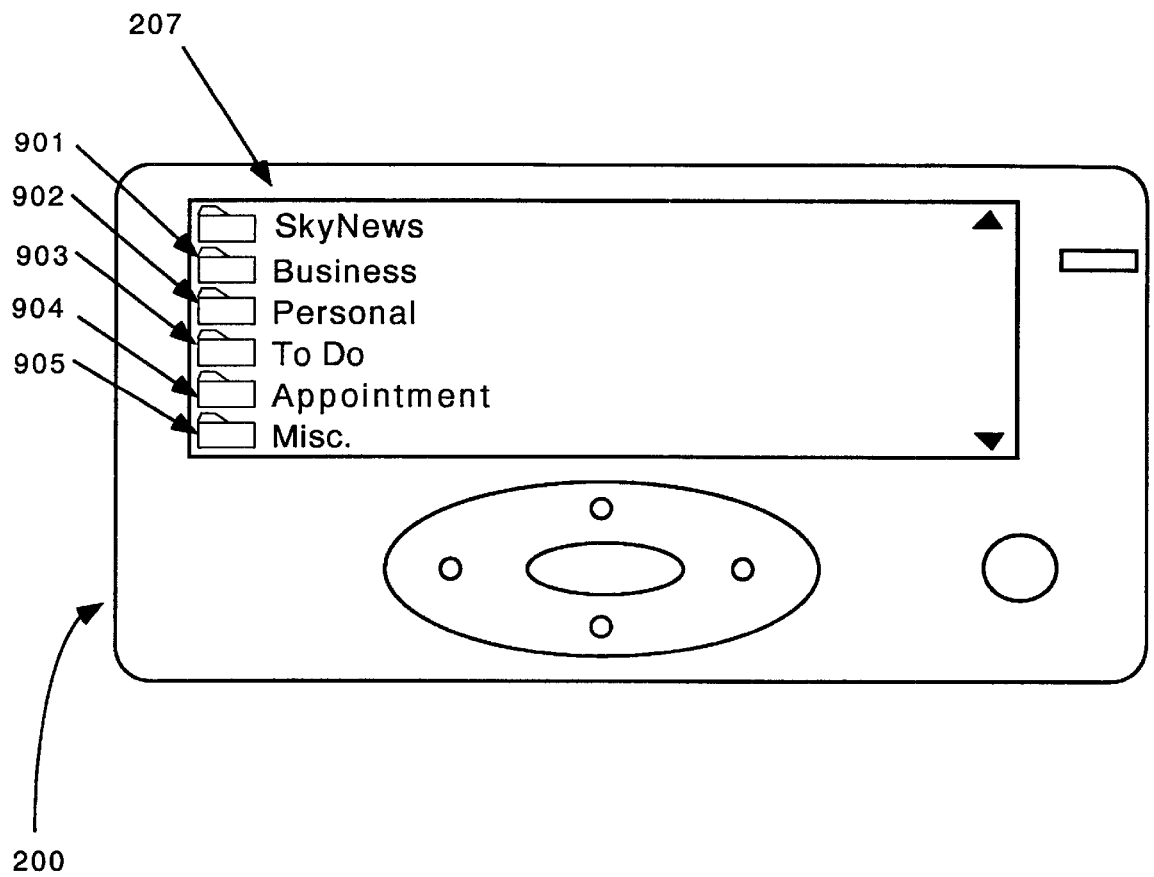
FIG. 9 illustrates the pager 200 and shows multiple folders 901–905 for storing messages.

In contrast to the limited capability to manage messages provided by the prior art pager 100, the present invention provides the capability to store receive messages into multiple user created folders. As better illustrated by FIG. 9, in the described embodiment, the pager 200 provides five special folders 901–905 in which messages can be stored for future reference—business 901, personal 902, to do 903, appointment 904 and misc. 905. Of course, in alternative embodiment other folders could be provided or folders could be user created. Messages can be transferred, from the received messages folder into one of these folders or from folder to folder, as will be described in greater detail with reference to FIG. 10.

As with many pagers, when messages are received by the pager, if the pager's memory is full, an older message is selected for deletion to make room for the new incoming message. In the described embodiment, messages are selected for deletion from the "Received" folder (shown in FIG. 2) and if a message is saved into one of folders 901–905, it will not be selected for deletion.

Figure 10:
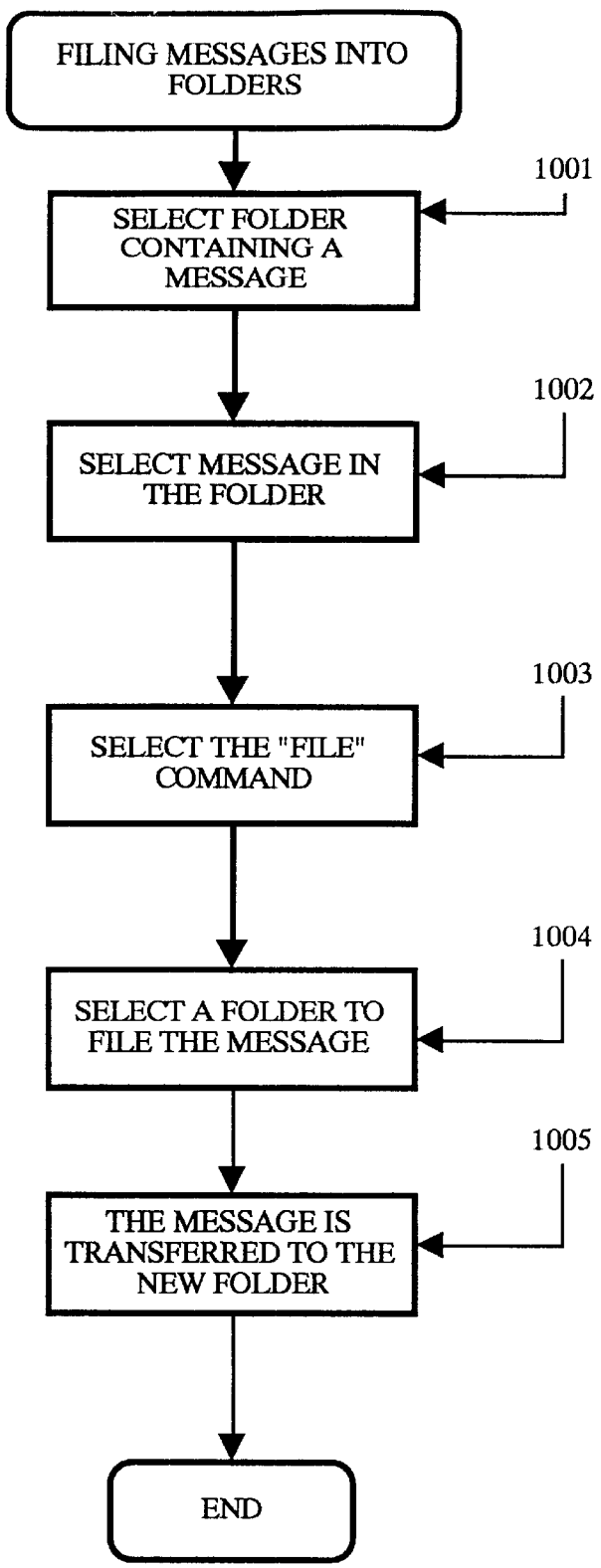
FIG. 10 provides a flow diagram illustrating a process for filing a message.

FIG. 10 provides a flow diagram illustrating the process for filing a message. Initially, a message is received by the pager 200 and is stored in a folder (as will be discussed in greater detail below, messages may be received into one of several special purpose folders or into the "received" folder illustrated by FIG. 2). To select a message to store into one of folders 901–905, first the folder containing the message is selected (e.g., the "received" folder) 1001 and the particular message within the folder is selected 1002. Again, in the described embodiment, messages are selected by utilizing the data entry device 201 and tabs 202–205. Responsive to selection of a message, the pager 200 displays the text of the message. On the bottom line of display 207, a set of commands including a "FILE" command are displayed. The file command is selected 1003. Responsive to selection of the FILE command, the pager 200 prompts the user to select a folder into which to file the message and a folder is selected 1004. The messages is then transferred to the selected folder 1005.

As one feature of the described embodiment, when a folder (such as folders 901–905) is empty, it is not displayed as one of the folders on the main display of pager 200. When a file is transferred to a folder that was previously empty, the folder is then displayed on the main display. This same feature is utilized by the special folders which will be discussed below. For example, if the "Skynews" folder is empty, it will not be displayed on display 200.

Messages in folders 901–905 may be managed in the same way as messages in the "Received" folder, e.g., the user can read the messages by selecting them, transfer them from one folder to another, send a reply to them, and delete them.

Deletion of all Messages in a Folder

The present invention further allows deletion of all messages in a single folder. This offers significant advantages over the pager 200 of the prior art which simply allowed deletion of all stored messages in the pager. For example, in the prior art, messages from SkyNews, as well as other business and personal messages, may all be stored in the folder displayed on display 104. The user may wish to delete the SkyNews messages, but to retain the rest. The user has the option to delete all messages, but not to delete only the SkyNews messages, the user must select each of the SkyNews messages and individually delete them.

Figure 12:
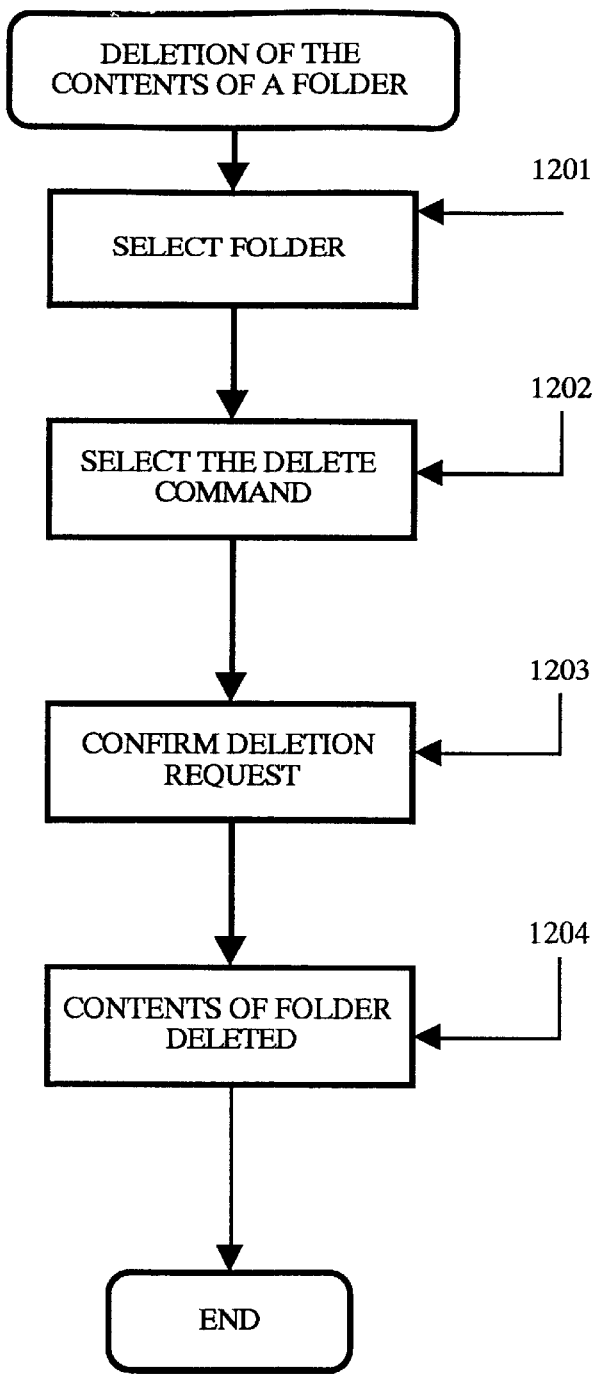
FIG. 12 provides a flow diagram illustrating a process for deleting all messages in a folder.

In the described embodiment, all messages in a single folder (e.g., the SkyNews folder) may be deleted while retaining the contents of other folders by following the steps of FIG. 12. Initially, a folder is selected 1201. On the bottom line of display 207, a set of commands including a "DELETE" command is displayed. The delete command is selected 1203. Responsive to selection of the DELETE command, the pager 200 prompts the user to confirm the deletion request 1203. After confirmation, the messages in the folder are deleted 1204.

Storing Messages Dependent on Message Type

As is well-known, pagers receive a stream of data which comprises messages. Each message within the stream may include a destination address (i.e., the address of the intended recipient pager) and may include a source address (the address or identifier of the sender).

Figure 11:
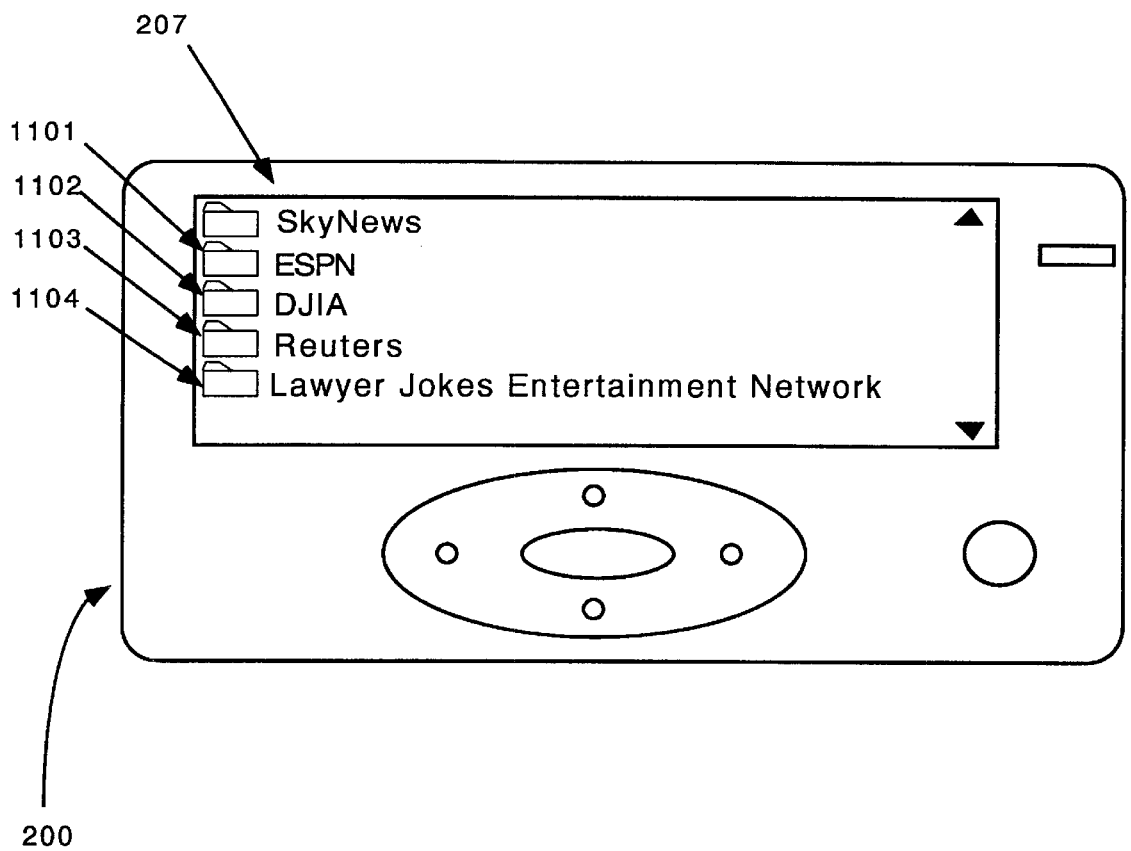
FIG. 11 illustrates the pager 200 and shows multiple "special" folders.

In the described embodiment, messages may be received into "special" folders based on the message's type. In the particular described embodiment, the message type is determined based on the source address. However, in alternate embodiment, other type information may be used. As illustrated by FIG. 11, various services such as "SkyNews", "ESPN", Dow Jones (DJIA)" and Reuters and even yet to be created services (e.g., the "Lawyer Jokes Entertainment Network") may provide messages. Messages from each of these services include a source address and based on the source address, the messages are stored into the appropriate folder 1101–1104 as they are received.

Other, general messages, are received into the "Received" folder.

Establishment of New Folders "Over the Air"

As an additional feature of the described embodiment, new folders may be established on the pager 200 "over the air" by information providers. For example, if a user decides to subscribe to "SkyNews", the user may contact the service provider for example by telephoning an 800 number and provide payment information (e.g., a credit card number). The service provider may then authorize a message to be transmitted to the user's pager. The message will instruct the user's pager to establish a new folder (e.g., SkyNews).

Importantly, in the described embodiment, only so-called "protected" messages may be used to establish a new folder over-the-air. Protected messages are required under established protocols to be transmitted from the paging service provider. This avoids security issues which otherwise might be presented by allowing establishment of messages over the air.

Transmission of "Special" Messages Based on Folder Type

Figure 13:
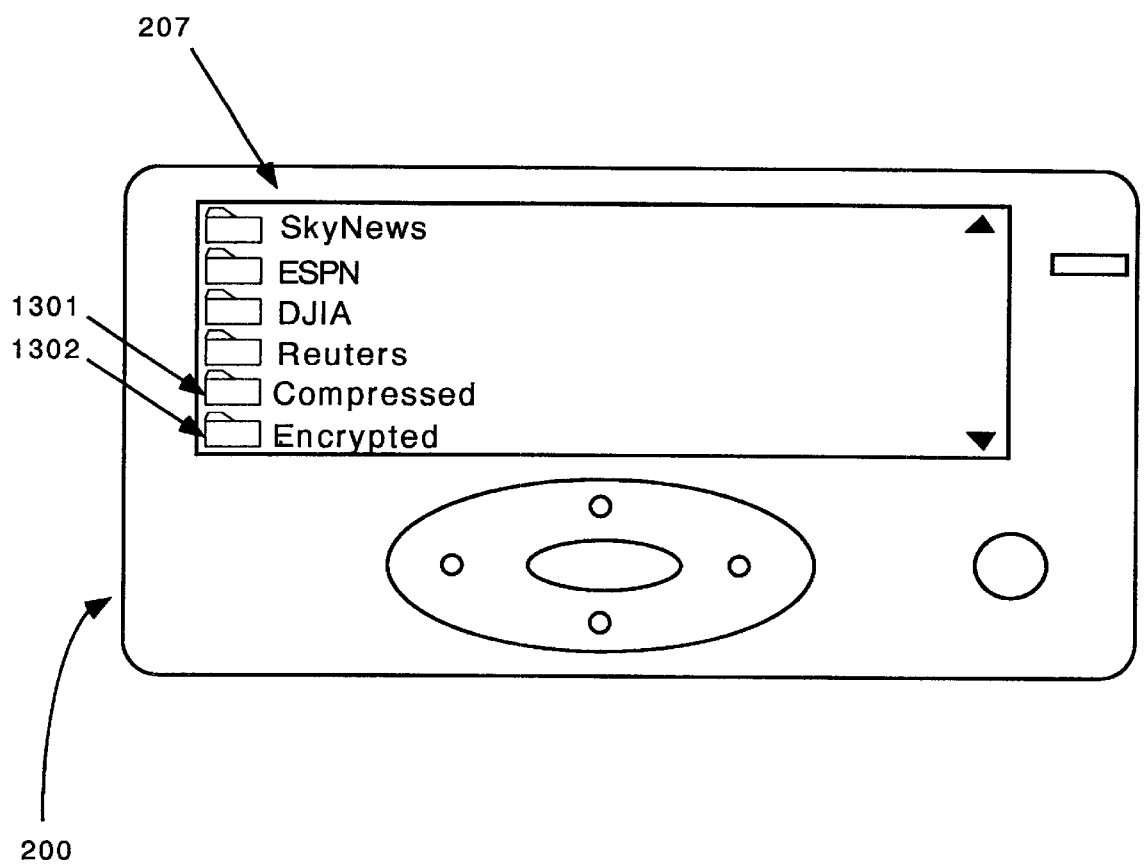
FIG. 13 illustrates the pager 200 and shows special purpose folders.

Certain messages may be transmitted and received in special formats. For example, certain messages may be encrypted and other messages may be compressed. Folders may be established for managing these special message types as is illustrated by FIG. 13.

When a message is received of the special type, the pager 200 receives the message into the special folder and proceeds to perform functions based on the message type without further user intervention. For example, if a message is received into encryption folder 1301, the pager decrypts the message without further user intervention. Similarly, if a message is received into compressed folder 1302, the pager decompresses the message without further user intervention.

In addition, a user can transmit messages from these special folders. If a message is transmitted from a special folder, the pager 200 performs functions based on the folder type without further user intervention. Again, by way of example, if a message is sent from the encryption folder 1301, the pager encrypts the message before transmission and if a message is transmitted from compressed folder 1302, the pager compresses the message before transmission.

ALTERNATIVES TO THE PREFERRED EMBODIMENT OF THE PRESENT INVENTION

There are, of course, alternatives to the described embodiment which are within the reach of one of ordinary skill in the relevant art. The present invention is intended to be limited only by the claims presented below.

Thus, what has been disclosed is a two-way pager.

What is claimed is:

1. A wireless messaging unit for composing alphanumeric messages comprising:

(a) a data entry device having a left tab, a right tab, an up tab and a down tab, and an enter function; and (b) a display containing individual alphanumeric characters and data manipulation tokens for selection using said data entry device.

2. The wireless messaging unit as recited by claim 1 wherein said data manipulation tokens are interspersed with said alphanumeric characters.

3. The wireless messaging unit as recited by claim 2 wherein one of said data manipulation tokens is a space token.

4. The wireless messaging unit as recited by claim 2 wherein one of said data manipulation tokens is a delete token.

5. The wireless messaging unit as recited by claim 1 wherein said data entry device comprises an oval area having a center serving as an enter function button, a left side portion serving as a left tab button, and a right side area serving as a right tab button.

6. The wireless messaging unit as recited by claim 5 wherein said data entry device further comprises an escape button.

7. An apparatus for composing alphanumeric messages comprising a display screen having displayed thereon alphanumeric characters and data manipulation tokens and a data entry device for selecting said alphanumeric characters and said data manipulation tokens.

8. The apparatus as recited by claim 7 wherein said data manipulation tokens are interspersed between said alphanumeric characters.

9. The apparatus as recited by claim 7 wherein one of said data manipulation tokens is a space token.

10. The apparatus as recited by claim 7 wherein one of said tokens is a delete token.

11. The apparatus as recited by claim 7 wherein said data entry device comprises a left tab, a right tab, an up tab and a down tab, and an enter function button.

12. The apparatus as recited by claim 7 wherein said data entry device comprises an oval area having a center serving as an enter function button, a left side portion serving as a left tab button, and a right side area serving as a right tab button.

13. The apparatus as recited by claim 12 wherein said data entry device further comprises an escape button.

* * * * *